UNITED STATES PATENT OFFICE.

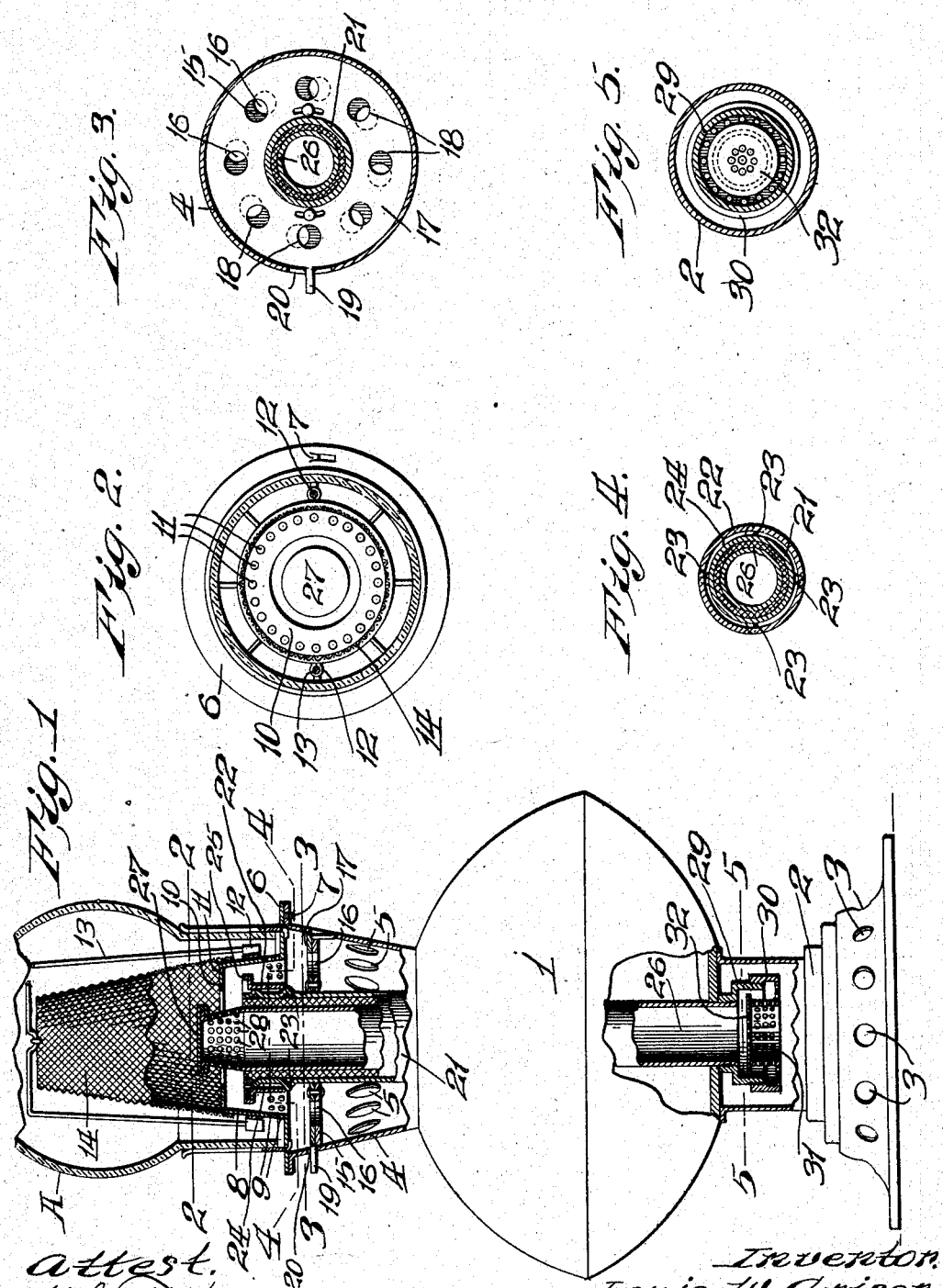

LOUIS W. GRISER, OF ST. LOUIS, MISSOURI.

LAMP.

No. 926,407.     Specification of Letters Patent.     Patented June 29, 1909.

Application filed February 8, 1909. Serial No. 476,847.

*To all whom it may concern:*

Be it known that I, LOUIS W. GRISER, a citizen of the United States, and resident of St. Louis, Missouri, have invented certain new and useful Improvements in Lamps, of which the following is a specification containing a full, clear, and exact description, reference being had to the accompanying drawings, forming a part hereof.
My invention relates generally to lamps, and more particularly to lamps employing a centrally disposed draft tube, and which also employ mantles to increase the illuminating power, the particular object of my invention being to provide simple means for regulating the draft or current of air delivered to and through the burner adjacent the upper end of the wick for the purpose of creating an even flame and consequently maintaining the entire mantle in an incandescent state.

To the above purposes, my invention consists in certain novel features of construction and arrangement of parts which will be hereinafter more fully set forth, pointed out in the claims, and illustrated in the accompanying drawings, in which:

Figure 1 is a side elevation of a lamp constructed in accordance with my invention and with parts in vertical section; Fig. 2 is a horizontal section taken on the line 2—2 of Fig. 1; Fig. 3 is a horizontal section taken on the line 3—3 of Fig. 1; Fig. 4 is a horizontal section taken on the line 4—4 of Fig. 1; and Fig. 5 is a horizontal section taken on the line 5—5 of Fig. 1.

Referring by numerals to the accompanying drawings: 1 designates the bowl or body of the lamp which contains the oil, and which bowl is mounted in the usual manner upon a suitable base 2, which is perforated, as designated by 3.

Formed integral with the top of the bowl 1 is a collar 4, which is perforated, as designated by 5, and said collar forms a support for the lamp burner. This burner comprises a plate 6, which rests on top of the collar 4, and said plate being locked to the collar by a tongue 7, which is punched from the plate 6 and is bent through the opening formed in the top of said collar 4.

Formed integral with the central portion of the plate 6 is a vertically disposed circular wall 8, through the lower portion of which is formed one or more rows of perforations 9, and formed integral with the top of this wall 8 is an inwardly projecting flange 10, through which is formed a row of perforations 11. Fixed to the opposite side of the wall 8 are sockets 12, which receive the lower ends of an inverted U-shaped wire 13, which supports the mantle 14.

Fixed to the collar 4 and arranged in the upper portion thereof is a horizontally disposed plate 15, in which is formed a series of draft openings 16, and arranged to slide on top of this plate 15 is a plate 17, through which is formed a series of apertures 18, which are adapted to coincide with the openings 16.

A finger 19 is formed integral with the edge of the plate 17 and which finger extends through a slot 20 formed in the collar 4, thus providing means for shifting the plate 17 from one position to another.

21 designates the wick casing, which is in the form of a tube centrally disposed within the collar 4, and supported by the plate 15 and the upper end of said wick casing, terminates a short distance below the flange 10.

22 designates a flame protecting ring, which is arranged upon the upper end of the wick casing 21, and said ring being supported upon lugs or projections 23 bent from said casing 21, and there being an annular space 24 between said ring and said casing. A flange 25 is formed integral with the top of the ring 22, which flange projects outward a short distance and terminates in the same plane occupied by the upper end of the casing 21.

26 designates a tube, which performs the function of the central draft tube of the lamp and also forms the inner wick casing, said tube being fixed to the bottom of the bowl 1 of the lamp and extending upward through the casing 21, and the upper end of said tube 26 projecting above the flange 10 on the upper end of the circular wall 8, and the top of said tube being closed by an imperforate disk 27. The wall of the upper end of the tube or that portion which projects above the upper end of the casing 21 tapers slightly toward the top, and said projecting portion is perforated, as designated by 28.

Detachably seated on the lower end of the draft tube 26 is a ring 29 and screw-seated on the lower end of said ring is a cap 30, with which is formed integral a vertically disposed perforated wall 31. Loosely arranged on top of this wall is a perforated disk 32, of light material, such as very thin metal, mica, or celluloid, and said disk is free to move between the upper end of the wall 31 and the lower end of the draft tube 26.

When a lamp of my improved construction is in use and the wick is lighted, the flame from the upper end of said wick passes upward through the annular opening between the perforated upper end of the tube 26 and the inner edge of the flange 10, and said flame passes upward into contact with the mantle, thereby maintaining the same in an incandescent state, as required to produce a strong white light. A center draft for the flame thus produced passes through the perforations in the wall 30 and disk 32, from thence upward through the draft tube 26, and discharges into the flame at the point of ignition, or immediately above the upper end of the wick. The outer draft for the flame enters the ring 4 through the apertures 5 and passes from thence through the coinciding apertures 16 and 18, from thence upward through the space between the flame protecting ring 22 and the wall 8, and also through the annular space 24 between said ring 22 and the outer wick casing 21. This distribution of draft to the flame maintains the same in a very even condition, and consequently maintains the mantle in an even state of incandescence. The outer draft to the flame can be regulated by shifting the disk 17 so as to regulate the size of the openings through the coinciding apertures 16 and 18, and when these openings are entirely cut off the outer draft enters the burner through the rows of apertures 9 in the circular wall 8.

Should the draft through the tube 26 become abnormal, the thin disk 32 will be lifted by suction and held against the lower end of the tube 26, and thus materially diminish the supply of air entering said tube 26.

The flame protecting ring 24 provides means whereby a small amount of draft or air is fed to the flame at the time the wick is first lighted, and the flange 25 on the upper end of said ring protects the flame from any excess draft which may pass between the protector ring and the circular wall 8.

The construction at the lower end of the central draft tube 26 provides means whereby the center draft for the flame is automatically regulated.

The wick in my improved lamp is raised and lowered by means of an ordinary wick raiser (not shown), and the lamp chimney A is supported on the plate 6 in the usual manner.

I claim:

1. In a lamp of the class described, a body, a burner supported thereon, a center draft tube extending through the body and the burner, the upper end of which tube is perforated, an automatic air inlet valve arranged on the lower end of the draft tube, a wick casing surrounding the upper portion of the draft tube, and a flame protecting ring positioned on the upper end of the wick casing.

2. In a lamp of the class described, a body, a burner supported thereon, a center draft tube extending through the body and the burner, the upper end of which tube is perforated, an automatic air inlet valve arranged on the lower end of the draft tube, a wick casing surrounding the upper portion of the draft tube, a flame protecting ring positioned on the upper end of the wick casing, and there being an annular space formed between said ring and casing.

3. In a lamp of the class described, a body, a burner supported thereon, a center draft tube extending through the body and the burner, the upper end of which tube is perforated, an automatic air inlet valve arranged on the lower end of the draft tube, a wick casing surrounding the upper portion of the draft tube, a flame protecting ring positioned on the upper end of the wick casing, and means located within the burner for controlling the outer draft to the wick arranged in the burner.

4. In a lamp of the class described, a body, a burner supported thereon, a center draft tube extending through the body and the burner, the upper end of which tube is perforated, an automatic air inlet valve arranged on the lower end of the draft tube, a wick casing surrounding the upper portion of the draft tube, a flame protecting ring positioned on the upper end of the wick casing, there being an annular space formed between said ring and casing, and means located within the burner for controlling the outer draft to the wick arranged in the burner.

5. The combination with a lamp and its burner, which lamp is provided with a center draft tube, the upper terminal portion of which is perforated and the top closed, of an automatic air inlet valve located at the lower end of the draft tube for regulating the admission of air in said tube, a circular wick inclosing the upper portion of the draft tube, and a horizontally disposed regulating shutter located within the burner for regulating and controlling the outer draft to the flame issuing from the wick.

In testimony whereof, I have signed my name to this specification, in presence of two subscribing witnesses.

LOUIS W. GRISER.

Witnesses:
M. P. SMITH,
E. L. WALLACE.